US012583114B2

(12) United States Patent　　　　(10) Patent No.:　US 12,583,114 B2
Toumatsu et al.　　　　　　　　　　(45) Date of Patent:　　　Mar. 24, 2026

(54) DEVICE FOR SIMULATING OPERATION OF ROBOT, DEVICE FOR CONTROLLING ROBOT, AND METHOD FOR SIMULATING OPERATION OF ROBOT

(71) Applicant: FANUC CORPORATION, Yamanashi (JP)

(72) Inventors: Ryoue Toumatsu, Yamanashi (JP); Takafumi Kajiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 244 days.

(21) Appl. No.: 18/259,519

(22) PCT Filed: Jan. 4, 2022

(86) PCT No.: PCT/JP2022/000048
§ 371 (c)(1),
(2) Date: Jun. 27, 2023

(87) PCT Pub. No.: WO2022/149570
PCT Pub. Date: Jul. 14, 2022

(65) Prior Publication Data
US 2024/0066700 A1　　Feb. 29, 2024

(30) Foreign Application Priority Data
Jan. 7, 2021　(JP) ................................. 2021-001550

(51) Int. Cl.
*B25J 9/16*　　　　(2006.01)
(52) U.S. Cl.
CPC ........... *B25J 9/1671* (2013.01); *B25J 9/1653* (2013.01)
(58) Field of Classification Search
CPC ........... B25J 9/16; B25J 9/1671; B25J 9/1653
See application file for complete search history.

(56) References Cited

U.S. PATENT DOCUMENTS 9,889,561 B2 * 2/2018 Sato ..................... B25J 11/0065
10,442,080 B2 * 10/2019 Muneto .................. B25J 9/1605
(Continued)

FOREIGN PATENT DOCUMENTS

JP　　01291307 A　11/1989
JP　　08066844 A　　3/1996
(Continued)

OTHER PUBLICATIONS

English Machine Translation for PCT International Search Report dated Mar. 15, 2022 for related International Application No. PCT/JP2022/000048, from which the instant application is based, 2 pgs.

(Continued)

*Primary Examiner* — Adam R Mott
*Assistant Examiner* — Sagar Kc
(74) *Attorney, Agent, or Firm* — Fredrikson & Byron, P.A.

(57)　　　　　ABSTRACT

This device for simulating the operation of a robot comprises: an acquisition unit 341 that acquires the position, relative to a robot 100 having a shaft that can move in a rotational or linear manner as a joint, of a mounting article of the robot 100, the mounting article being mounted on a link that is connected to the joint, and also acquires a constraint for at least one of the speed, acceleration, and acting force generated in the mounting article when the robot 100 operates; a calculation unit 342 that calculates at least one of the speed, acceleration, and acting force anticipated to be generated in the mounting article in accordance with the position of the mounting article relative to the robot 100 when the robot 100 executes an operation; and a comparison unit 342 that compares the constraint and at least one of the speed, acceleration, and acting force calculated by the calculation unit 342.

9 Claims, 5 Drawing Sheets

(56)           References Cited

U.S. PATENT DOCUMENTS

| | | | |
|---|---|---|---|
| 2016/0129589 A1* | 5/2016 | Liang ................... | G05B 19/416 |
| | | | 700/254 |
| 2016/0354933 A1* | 12/2016 | Sato ....................... | B25J 9/1633 |
| 2017/0008171 A1* | 1/2017 | Iwatake ................. | B25J 9/1633 |
| 2018/0012789 A1* | 1/2018 | Handa ..................... | B25J 9/042 |
| 2019/0160678 A1* | 5/2019 | Zhang ..................... | B25J 9/163 |
| 2020/0254631 A1* | 8/2020 | Sawada ................... | B25J 19/06 |
| 2020/0405414 A1* | 12/2020 | Shelton, IV ... | A61B 17/320092 |
| 2022/0134571 A1* | 5/2022 | Takeuchi .............. | B25J 9/1694 |
| | | | 700/259 |

FOREIGN PATENT DOCUMENTS

| | | |
|---|---|---|
| JP | 2016087755 A | 5/2016 |
| JP | 2018062026 A | 4/2018 |
| JP | 2020114623 A | 7/2020 |

OTHER PUBLICATIONS

English Machine Translation for Japanese Publication No. JP 1989(H01)-291307 A, published Nov. 22, 1989, 7 pgs.
English Machine Translation for Japanese Publication No. JP 1996(H08)-066844 A, published Mar. 12, 1996, 72 pgs.
English Machine Translation for Japanese Publication No. JP 2016-087755 A, published May 23, 2016, 38 pgs.
English Machine Translation for Japanese Publication No. JP 2018-062026 A, published Apr. 19, 2018, 19 pgs.
English Machine Translation for Japanese Publication No. JP 2020-114623 A, published Jul. 30, 2020, 25 pgs.

* cited by examiner

DEVICE FOR SIMULATING OPERATION OF ROBOT, DEVICE FOR CONTROLLING ROBOT, AND METHOD FOR SIMULATING OPERATION OF ROBOT

RELATED APPLICATIONS

This application is a 35 U.S.C. 371 national phase filing from International Application No. PCT/JP2022/000048, filed Jan. 4, 2022, which claims priority to Japanese Application No. 2021-001550, filed, Jan. 7, 2021, the contents of which are incorporated herein by reference.

FIELD

The present invention relates to a robot operation simulation device, a robot control device, and a robot operation simulation method.

BACKGROUND

It is previously known to determine whether the tip of a tool is positioned in an operation-restricting region having any sire and being set by coordinate values in a world coordinate system and restricting at least one of the velocity and the acceleration of a robot when the tip of the tool is positioned in the operation restricting-region (for example, see PTL 1).

CITATION LIST

Patent Literature

[PTL 1] Japanese Unexamined Patent Publication (Kokai) No. 2018-062026

SUMMARY

Technical Problem

Various attachments such as an end effector are attached to an industrial robot. The attachments have different load capacities, rigidity values, and the like; and therefore, when the operation of the robot does not fit an attachment, the attachment may receive a heavy load and be unexpectedly damaged depending on the robot operation.

The technology described in the aforementioned patent literature assumes restricting at least one of the velocity and the acceleration of a robot when a specific tool attached to the tip of the robot exists in an operation-restricting region but does not at all assume restricting the operation of the robot according to attributes of an attachment attached to the robot, such as the load capacity and the rigidity value.

Further, in order to fit the operation of a robot to an attachment having various attributes and being attached to a robot, a constraint on the operation of the robot is preferably set by a user according to the attributes of the attachment. However, the technology described in the aforementioned patent literature does not at all assume setting a constraint on the operation of the robot by a user according to the attributes of the attachment.

Therefore, the technology described in the aforementioned patent literature has an issue that the operation of the robot may not fit an attachment and the attachment may be damaged by receiving a load beyond expectation.

Further, examples of an attachment include an attachment attached between axes of joints of a robot in addition to a tool attached to the tip of the robot, such as an end effector. The technology described in the aforementioned patent literature does not at all assume restricting a robot operation depending on the attachment position of an attachment relative to the robot. Therefore, there is an issue that the operation of the robot may not fit an attachment attached at various positions on the robot and the attachment may be damaged by receiving a load beyond expectation.

An object of the present invention in one aspect is to provide a robot operation simulation device, a robot control device, and a robot operation simulation method that enable fitting of the operation of a robot to an attachment attached to the robot and suppression of damage to the attachment.

Solution to Problem

An outline of the present disclosure is as follows.

A robot operation simulation device according to an aspect of the present invention includes: an acquisition unit acquiring a position of an attachment attached to a link connected to a joint of a robot relative to the robot, the joint including a rotatable or linearly movable axis, and a limiting condition on at least one of a velocity, an acceleration, and an acting force generated in the attachment when the robot operates; a calculation unit calculating at least one of a velocity, an acceleration, and an acting force expected to be generated in the attachment according to a position of the attachment relative to the robot when the robot executes operation; and a comparison unit comparing at least one of a velocity, an acceleration, and an acting force calculated by the calculation unit with the limiting condition.

The robot operation simulation device may further include a determination unit determining whether at least one of a velocity, an acceleration, and an acting force calculated by the calculation unit satisfies the limiting condition, based on a comparison result by the comparison unit.

The determination unit may further determine a place where the limiting condition is not satisfied in an operation program describing operation of the robot, when determining that at least one of a velocity, an acceleration, and an acting force calculated by the calculation unit does not satisfy the limiting condition, and the robot operation simulation device may further include a display processing unit performing processing for displaying, on a display device, a place where the limiting condition is not satisfied in the operation program.

The robot operation simulation device may further include a modification instruction generation unit generating a modification instruction for causing the operation program to be modified in such a way that at least one of a velocity, an acceleration, and an acting force calculated by the calculation unit satisfies the limiting condition, when at least one of a velocity, an acceleration, and an acting force calculated by the calculation unit does not satisfy the limiting condition, wherein the display processing unit may perform processing for displaying the modification instruction on the display device.

The modification instruction generation unit may generate a modification instruction for causing the operation program to be modified in such a way as to increase a velocity or an acceleration related to the limiting condition within the limiting condition, when a velocity or an acceleration calculated by the calculation unit satisfies the limiting condition.

The calculation unit may calculate at least one of a velocity, an acceleration, and an acting force expected to be generated in the attachment when the robot executes operation in accordance with the operation program after modification modified in accordance with the modification instruction, and the comparison unit may compare at least one of a velocity, an acceleration, and an acting force calculated in accordance with the operation program after modification by the calculation unit with the limiting condition.

The robot operation simulation device may further include a modification unit modifying the operation program in such a way that at least one of a velocity, an acceleration, and an acting force calculated by the calculation unit satisfies the limiting condition, when at least one of a velocity, an acceleration, and an acting force calculated by the calculation unit does not satisfy the limiting condition.

The modification unit may modify the operation program in such a way as to increase a velocity or an acceleration related to the limiting condition within the limiting condition, when a velocity or an acceleration calculated by the calculation unit satisfies the limiting condition.

The robot may be an articulated robot including a plurality of the joints each of which includes the axis, and the attachment may be attached to the link connected to each of the adjoining joints or the link closest to a tip of the robot.

A robot control device according to another aspect of the present invention includes: the aforementioned robot operation simulation device; and a robot control unit controlling operation of the robot.

A robot operation simulation method according to yet another aspect of the present invention includes: a step of acquiring a position of an attachment attached to a link connected to a joint of a robot relative to the robot, the joint including a rotatable or linearly movable axis, and a limiting condition on at least one of a velocity, an acceleration, and an acting force generated in the attachment when the robot operates; a step of calculating at least one of a velocity, an acceleration, and an acting force expected to be generated in the attachment according to a position of the attachment relative to the robot when the robot executes operation; and a step of comparing at least one of a calculated velocity, a calculated acceleration, and a calculated acting force with the limiting condition.

Advantageous Effects of Invention

The present invention provides an effect of enabling fitting of the operation of a robot to an attachment attached to the robot and suppression of damage to the attachment.

DESCRIPTION OF EMBODIMENTS

Several embodiments of the present invention will be described below with reference to diagrams. However, the descriptions are intended to simply exemplify preferred embodiments of the present invention and are not intended to limit the present invention to such specific embodiments.

Figure 1:
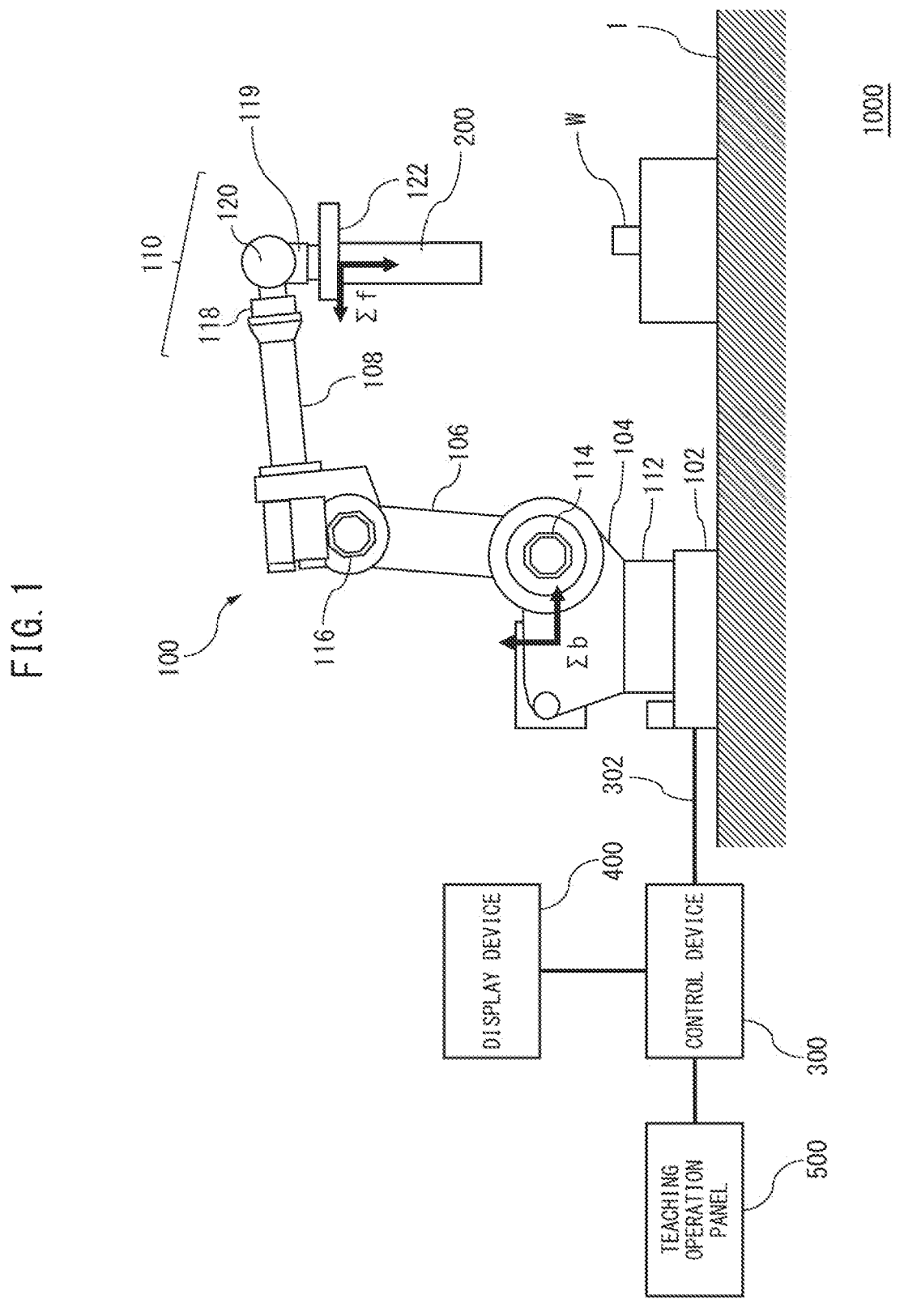
FIG. 1 is a schematic configuration diagram of a robot system according to an embodiment in which a robot operation simulation device is implemented.

FIG. 1 is a schematic configuration diagram of a robot system 1000 according to an embodiment in which a robot operation simulation device is implemented. The robot system 1000 includes a robot 100, a tool 200 attached to the tip of the robot 100, a control device 300 controlling the robot 100 and the tool 200, a display device 400, and a teaching operation panel 500.

The robot 100 is an articulated robot and includes six joints in the example illustrated in FIG. 1. Note that while an articulated robot each joint of which includes a rotatable axis is exemplified below as the robot 100, the robot 10 may be any robot such as a robot each joint of which includes a linearly movable axis, a single-axis robot, or a delta robot. The robot 100 includes a pedestal 102, a rotary stage 104, a first arm 106, a second arm 108, and a wrist 110. Each of the rotary stage 104, the first arm 106, the second arm 108, and the wrist 110 is supported by an axis provided at a joint where the part is mounted and operates by driving the axis by a servo motor.

The pedestal 102 is a member to be a base when the robot 100 is installed on a floor 1. The rotary stage 104 is rotatably mounted on the top surface of the pedestal 102 by a joint 112 with an axis provided in such a way as to be orthogonal to one surface of the pedestal 102 as the center of rotation.

One end of the first arm 106 is mounted on the rotary stage 104 at a joint 114 provided on the rotary stage 104. The first arm 106 according to the present embodiment is rotatable at the joint 114 around an axis provided in parallel with a surface of the pedestal 102 on which the rotary stage 104 is mounted, as illustrated in FIG. 1.

One end of the second arm 108 is mounted on the first arm 106 at a joint 116 provided at the other end of the first arm 106 on the opposite side of the joint 114. The second arm 108 according to the present embodiment is rotatable at the joint 116 around an axis provided in parallel with a surface of the pedestal 102 on which the rotary stage 104 is mounted, as illustrated in FIG. 1.

The wrist 110 is mounted on the tip of the second arm 108 on the opposite side of the joint 116 through a joint 118. The wrist 110 includes a joint 120 and is bendable at the joint 120 with an axis provided in parallel with the axis of the joint 114 and the axis of the joint 116 as the center of rotation. Further, the wrist 110 is rotatable at the joint 118 with an axis parallel with the longitudinal direction of the second arm 108 as the center of rotation on a surface orthogonal to the longitudinal direction of the second arm 108. Furthermore, the wrist 110 is formed in such a way that a tool mounting surface (tool mounting part) 122 at the tip of the wrist 110 on the opposite side of the joint 118 is rotatable at a joint 119. The rotation axis of the joint 120 is formed in such a way as to intersect the rotation axis of the joint 118 and the rotation axis of the joint 119 at right angles at the same point.

The tool 200 is mounted on the tool mounting surface 122. The tool 200 includes a mechanism or a device for performing work on a workpiece W. For example, the tool 200 may include a laser for processing the workpiece W or a servo gun for welding the workpiece W. Alternatively, the tool 200 may include an end effector (robot hand) for gripping the workpiece W or a part to be installed on the workpiece W.

The control device 300 is an embodiment of a robot operation simulation device. The control device 300 is connected to the robot 100 through a communication line 302 and receives information indicating operating status of a servo motor driving an axis provided in each joint of the robot 100, and the like from the robot 100 through the communication line 302. Then, the control device 300 controls the position and the attitude of each movable part in the robot 100 by controlling the servo motor, based on the received information, and information received from an upper control device (unillustrated) or information indicating preset operation of the robot 100.

For example, the display device 400 is configured with a liquid crystal display (LCD). The display device 400 displays information related to modification of an operation program to be described later, and the like in accordance with a command from the control device 300. An operation by an operator is input to the teaching operation panel 500. Through the manual operation of the teaching operation panel 500, the operator executes generation, modification, or registration of the operation program of the robot 100, or setting of various parameters of the operation program, and, in addition, a playback operation, jog feeding, and the like of the robot 100 based on the operation program. Note that the display device 400 and the teaching operation panel 500 may be integrated. Further, the teaching operation panel 500 may include operation input members such as a mouse and a keyboard.

As illustrated in FIG. 1, a coordinate system (hereinafter referred to as a robot coordinate system) Σb fixed to the robot base and a coordinate system (hereinafter referred to as a tool mounting surface coordinate system) Σf fixed to the tool mounting surface 122 are set to the robot system 1000. In the control device 300, the position of the origin and the attitude of the tool mounting surface coordinate system Σf can be recognized as needed, based on a specification of the robot 100, such as the angle of a joint and an arm length of the robot 100.

The robot 100 operates in accordance with the operation program. For example, when the tool 200 is an end effector, the robot 100 moves the tip thereof from a first position (initial position) to a second position where the end effector can grip the workpiece W and, after gripping the workpiece W at the second position, moves the workpiece W to a third position in order to apply a predetermined process (such as welding) to the workpiece W, in accordance with the operation program. In the operation, the first to the third positions (coordinates) and the velocity and the acceleration when the robot 100 operates are described in the operation program.

When the robot 100 operates in accordance with the operation program, an acting force (inertial force) is generated in the tool 200 mounted on the tool mounting surface 122 at the tip of the robot 100. Further, in the case of the tool 200 being an end effector, when the workpiece W is gripped by the end effector, the workpiece W causes the end effector to generate an acting force when the robot 100 operates. For example, a stress may concentrate on the base of the tool 200 or the like by the generated acting force.

Further, various attachments other than the tool 200 are attached to the robot 100, and some of the attachments may be attached to a location other than the tip of the robot 100. Examples of an attachment attached to a location other than the tip of the robot 100 include a wire body, a clamp metal sheet, a feeder, a terminal block, and an air electromagnetic valve. The attachments attached to locations other than the tip of the robot 100 are attached between axes of joints of the robot 100. An acting force is generated in the attachment attached to a location other than the tip of the robot 100 when the robot 100 operates.

A wire body includes a cable, an air tube, and the like. Examples of a cable include an electric current supply cable supplying electric power to a servo motor provided in the tool 200 at the tip of the robot 100 or a joint, and a signal cable sending a control signal to the tool 200. For example, an air tube is a tube for supplying air to the tool 200 at the tip of the robot 100. A clamp metal sheet is a metal fixture fixing the wire bodies along the first arm 106 and the second arm 108. When the tool 200 is a welding torch, a feeder supplies a welding material to the welding torch. A terminal block is a base to which a terminal connecting wire bodies is fixed. An air electromagnetic valve is a valve for controlling air supply from an air tube to the tool 200.

It is assumed that when an acting force generated by the operation of the robot 10 is strong, an attachment is damaged by the acting force. Therefore, the robot 100 is preferably operated in such a way that the generated acting force falls within a range based on the load capacity, the rigidity value, and/or the like of the attachment. Then, since the magnitude of the acting force generated in the attachment is determined by the mass and the acceleration of the attachment, the acceleration when the robot 100 operates is preferably restricted to a predetermined threshold value or lower in such a way as to fall within the range of acting force based on the load capacity, the rigidity value, and/or the like of the attachment.

With regard to the velocity when the robot 100 operates, an acting force is theoretically not generated as long as the robot 100 operates at a constant velocity, however a high velocity may cause a trouble. Increase in velocity increases an airflow volume received by an attachment and the workpiece W according to the operation of the robot 100 and therefore may cause a trouble; and for example, when a gripped object gripped by the end effector is a perishable food, a higher velocity when the robot 100 operates may cause the perishable food to be more likely to rot by being in contact with more amount of air. Further, a higher velocity when the robot 100 operates may generate specific vibration in the robot 100. Accordingly, the velocity of the robot 100 is also preferably restricted in such a way as to be equal to or less than a predetermined threshold value. Note that the predetermined threshold value defining the upper limit of the velocity may be determined from user experience.

In view of the above, a user specifies limiting conditions (threshold values) on at least one or more of a velocity, an acceleration, and an acting force that act on an attachment, according to the present embodiment. Further, an acting force acting on the attachment when the robot 100 operates varies by the attachment position of the attachment relative to the robot 100 and the barycenter position of the attachment, and therefore, the user specifies positional information indicating a part of the robot 100 where the attachment is mounted and the barycenter position of the attachment. Note that the barycenter position of the attachment is an embodiment of the position of an attachment relative to a robot. Then, at least one or more of the velocity, the acceleration, and the acting force of the attachment are calculated from operation information of the robot 100 by a simulation without actually operating the robot 100, and whether the calculated values satisfy the respective limiting conditions is determined. Then, when at least one of the velocity, the acceleration, and the acting force of the attachment does not satisfy the limiting condition, the operation program is modified in such a way as to satisfy the limiting condition. Thus, when the robot 100 is controlled by the modified operation program, the velocity, the acceleration, or the acting force when the robot 100 operates falls within the limiting condition, and therefore, damage to the attachment is suppressed when the robot 100 operates.

Figure 2:
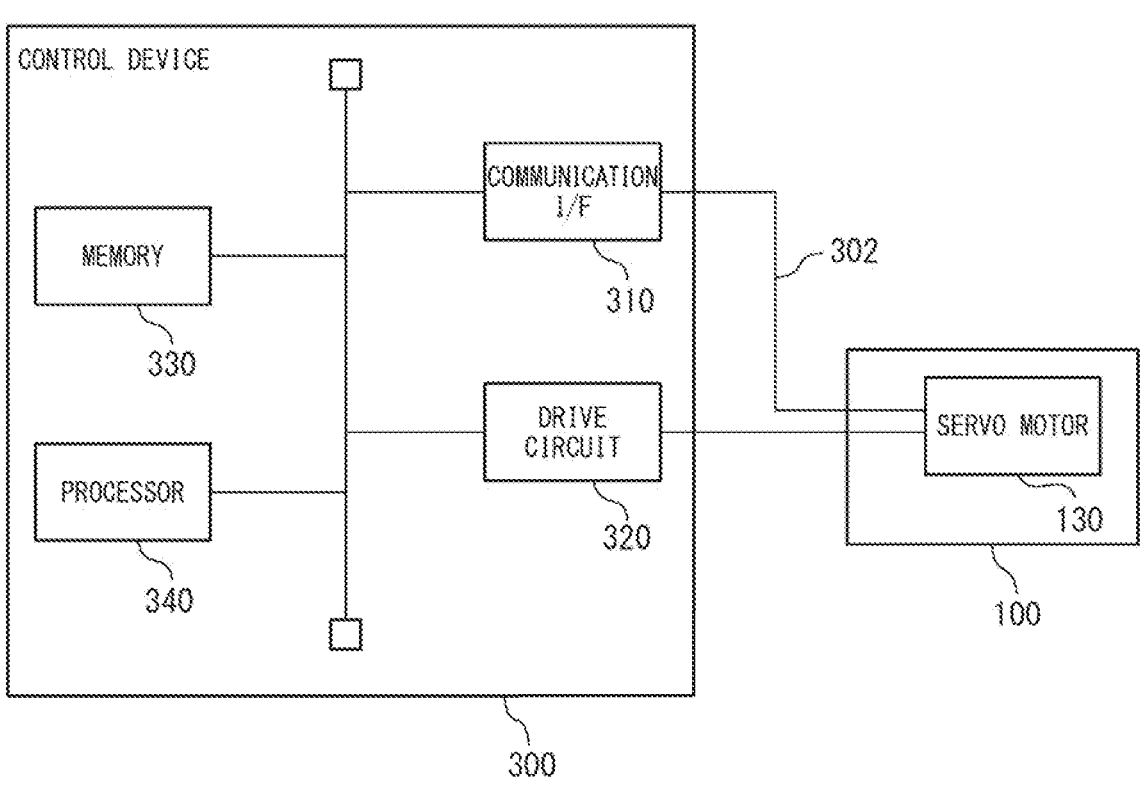
FIG. 2 is a schematic configuration diagram of a control device.

A configuration of the control device 300 for providing the processing as described above will be described below. FIG. 2 is a schematic configuration diagram of the control device 300. The control device 300 includes a communication interface 310, a drive circuit 320, a memory 330, and a processor 340. For example, the communication interface 310 includes a communication interface for connecting the control device 300 to the communication line 302, and a circuit for executing processing related to transmission and reception of signals through the communication line 302. Then, for example, the communication interface 310 receives information indicating operating status of a servo motor 130, such as a measured value of an amount of rotation from an encoder for detecting an amount of rotation of the servo motor 130, from the robot 100 through the communication line 302 and transfers the information to the processor 340. Note that while one servo motor 130 is representatively illustrated in FIG. 3, the robot 100 may, for each joint, include a servo motor driving the axis of the joint.

Further, the communication interface 310 includes an interface circuit for connecting the processor 340 to the display device 400 or the teaching operation panel 500, and a circuit for executing processing related to transmission and reception of signals to and from the teaching operation panel 500 or the display device 400.

The drive circuit 320 is connected to the servo motor 130 through an electric current supply cable and supplies electric power based on torque to be generated by the servo motor 130, a rotation direction, or a rotation velocity to the servo motor 130 in accordance with control by the processor 340.

For example, the memory 330 includes a readable-writable semiconductor memory [random-access memory (RAM)], a read-only semiconductor memory [read-only memory (ROM)], and a nonvolatile memory. Furthermore, the memory 330 may include a storage medium such as a semiconductor memory card, a hard disk, or an optical storage medium, and a device for accessing the storage medium.

The memory 330 stores various computer programs for controlling the robot 100 such as the aforementioned operation program of the robot 100, the programs being executed by the processor 340 in the control device 300. Specifically, a system program supporting basic functions of the robot 100 and the control device 300 is stored in a ROM in the memory 330. Further, data related to the specification of the robot 100 such as the arm length between joints of the robot 100 are also stored in the ROM in the memory 330. Further, the operation program of the robot instructed according to an application (such as a spot welding program) and related setting data are stored in a nonvolatile memory in the memory 330. Further, the memory 330 stores information for controlling the operation of the robot 100 when operating the robot 100. Furthermore, the memory 330 stores information indicating operating status of the servo motor 130 and being acquired from the robot 100 during operation of the robot 100, and the like.

Figure 3:
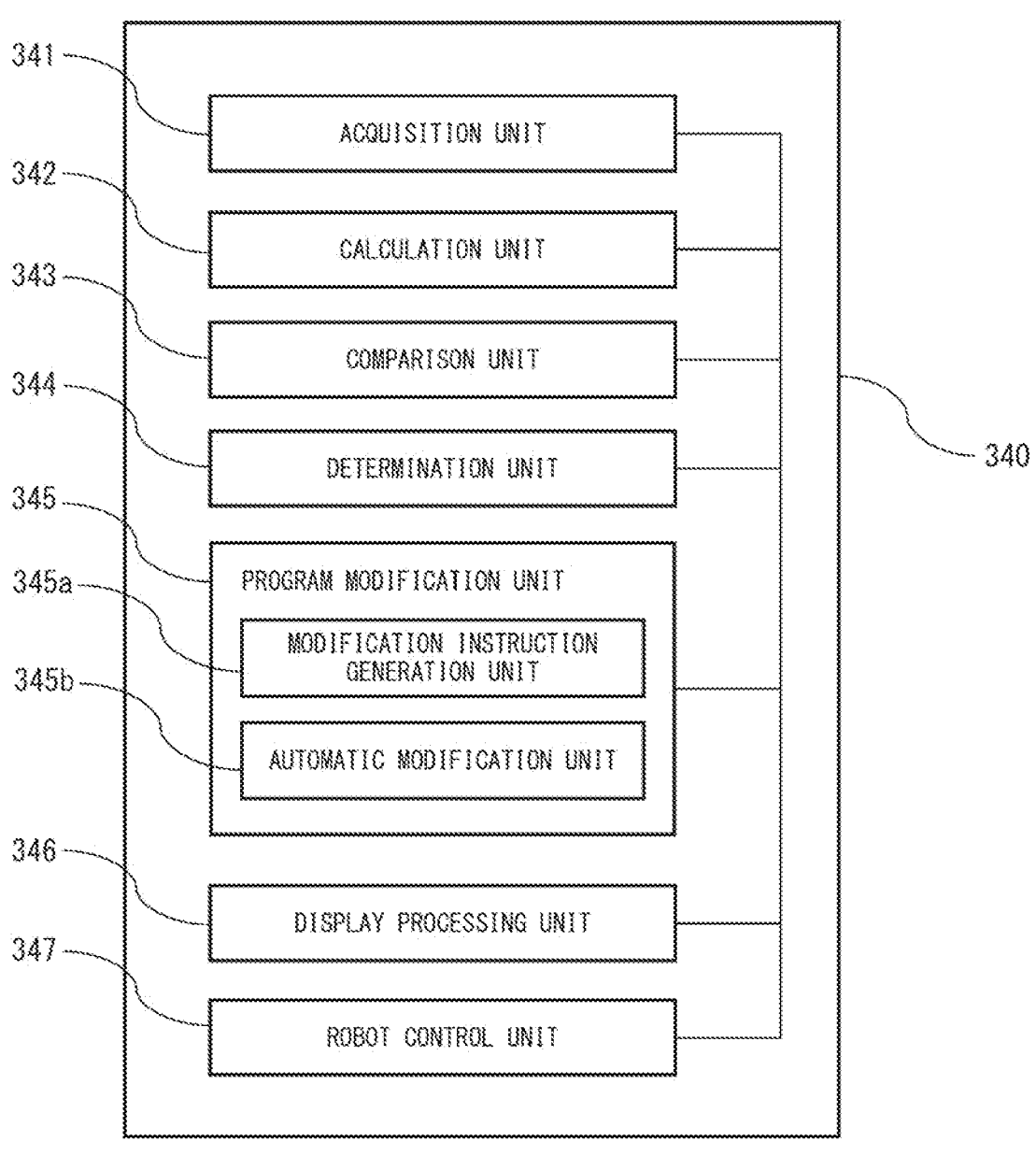
FIG. 3 is a functional block diagram of a processor.

FIG. 3 is a functional block diagram of the processor 340 related to processing of determining whether at least one of the velocity, the acceleration, and the acting force of the robot 100 satisfies a limiting condition and modifying the operation program when the limiting condition is not satisfied, and processing of controlling the robot 100 by using the operation program. The processor 340 includes an acquisition unit 341, a calculation unit 342, a comparison unit 343, a determination unit 344, a program modification unit 345, a display processing unit 346, and a robot control unit 347. The program modification unit 345 includes a modification instruction generation unit 345a and an automatic modification unit 345b. For example, each of the units included in the processor 340 is a functional module provided by a computer program executed on the processor 340. Alternatively, each of the units may be implemented as a dedicated arithmetic circuit implemented in part of the processor 340. A computer program for executing the processing in each unit included in the processor 340 may be provided in a form of being recorded on a computer-readable recording medium such as a semiconductor memory, a magnetic recording medium, or an optical recording medium.

Without actually operating the robot 100, the processor 340 calculates the velocity, the acceleration, or the acting force generated when the robot 100 operates by a simulation and determines whether a limiting condition is satisfied, with the configuration illustrated in FIG. 3. Then, when the limiting condition is not satisfied, the processor 340 performs processing for modifying the operation program. Note that while the processor 340 includes the robot control unit 347 in the configuration example illustrated in FIG. 3, the robot operation simulation device according to the present embodiment may not control the robot 100 and may not include the robot control unit 347 in this case. For example, the robot operation simulation device may be implemented in electronic equipment not controlling the robot 100, such as a personal computer.

The acquisition unit 341 in the processor 340 acquires at least one of limiting conditions on a velocity, an acceleration, and an acting force of an attachment input by operating the teaching operation panel 500 by a user. The limiting condition is specified by the user, based on the load capacity, the rigidity value, and/or the like of the attachment and is input from the teaching operation panel 500. For example, it is assumed that the attachment is a robot hand attached to the tip of the robot 100, the load capacity of the robot hand is denoted by F [N], the mass of a transfer target object (workpiece W) transferred by the robot hand is denoted by m [kg], and the acceleration of the transfer target object is denoted by a [m/s$^2$]. When both the load capacity F and the acceleration a are positive values, F>ma needs to be satisfied, and therefore, the acceleration limiting condition is a <F/m. Note that the load capacity F of the robot hand is assumed to be a load capacity related only to an acting force generated by the transfer target object excluding an acting force generated by the self-weight of the robot hand.

Further, the acquisition unit 341 acquires information about the attachment, the information being input by operating the teaching operation panel 500 by the user. The information about the attachment includes the attachment position of the attachment relative to the robot 100, the mass of the attachment, and the barycenter position of the attachment. Note that the attachment position is a position on the robot 100 where the attachment is attached and, for example, is a position (coordinates) of the attachment relative to an axis closest to the attachment on the pedestal 102 side of the attachment. Further, the barycenter position is coordinates viewed from the attachment position (coordinates with the attachment position as the origin).

Figure 4:
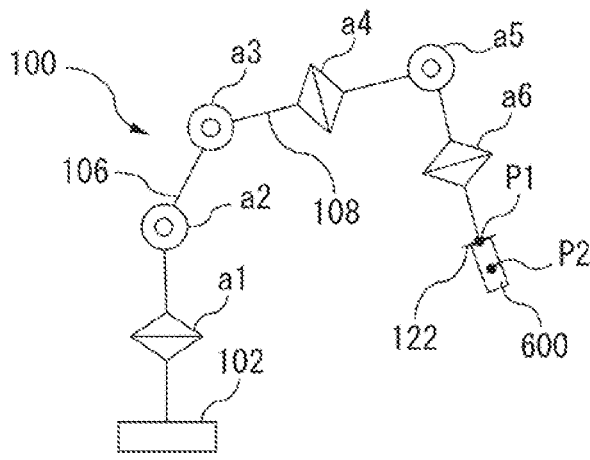
FIG. 4 is a schematic diagram for illustrating an attachment position and a barycenter position of an attachment relative to a robot.
Figure 5:
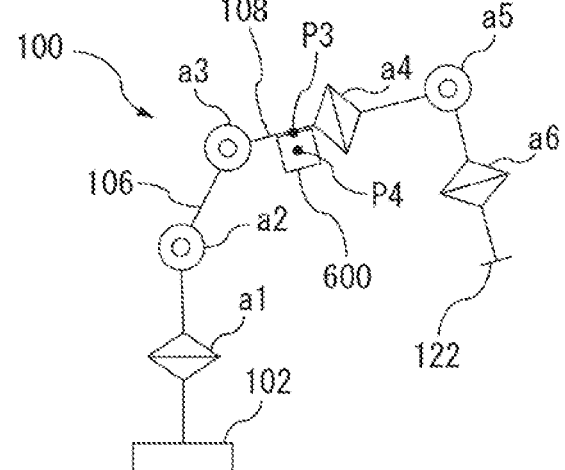
FIG. 5 is a schematic diagram for illustrating an attachment position and a barycenter position of an attachment relative to a robot.

FIG. 4 and FIG. 5 are schematic diagrams for illustrating the attachment position and the barycenter position of the attachment 600 relative to the robot 100 and are simplified diagrams illustrating the axis of each joint and the arms that are included in the robot 100. Six axes of the joints included in the robot 100 are indicated in an order of a first axis a1, a second axis a2, a third axis a3, a fourth axis a4, a fifth axis a5, and a sixth axis a6 from the pedestal 102 toward the tip of the robot 100 in FIG. 5 and FIG. 6. Note that the first axis a1 is the axis of the joint 112, the second axis a2 is the axis of the joint 114, the third axis a3 is the axis of the joint 116, the fourth axis a4 is the axis of the joint 118, the fifth axis a5 is the axis of the joint 120, and the sixth axis a6 is the axis of the joint 119.

The attachment 600 is attached to a link rotatably or linearly movably connected to a joint of the robot, the joint including a rotatable or linearly movable axis. Note that "an attachment being attached to a link" includes both cases of the attachment 600 being directly attached to the link and the attachment 600 being attached to the link through another part. For example, when the attachment 600 is the aforementioned wire body, the attachment 600 is attached to a link through a clamp metal sheet, and such a style is also included in "an attachment being attached to a link." In the example of the articulated robot illustrated in FIG. 1, the attachment 600 is attached on the tip side of the robot 100 relative to the sixth axis a6, such as on the tool mounting surface 122, or is attached between an i-th axis and an (i+1)-th axis of the robot 100. When the attachment 600 is attached on the tip side of the robot 100 relative to the sixth axis a6, the attachment 600 is attached on a link connected on the tip side of the robot 100 relative to the joint 119 of the sixth axis a6 (including on the tool mounting surface 122). Further, when the attachment 60W is attached between an i-th axis and an (i+1)-th axis, the attachment 600 is attached on a link connected to the joints including the i-th axis and the (i+1)-th axis (for example, on the first arm 106 or the second arm 108). Note that i is a natural number, and the maximum value of i is a value acquired by subtracting 1 from the number of joints (number of axes) of the robot 100. For example, in the case of the six-axis robot 100 as illustrated in FIG. 1, FIG. 4, and FIG. 5, i=1, 2, 3, 4, 5.

FIG. 4 illustrates an example of the attachment 600 being attached to the tool mounting surface 122, similarly to FIG. 1, and the attachment 600 corresponds to the tool 200 in FIG. 1. Further, FIG. 5 illustrates an example of the attachment 600 being attached between the third axis a3 and the fourth axis a4. In other words, FIG. 5 corresponds to a case of i=3.

At a position P1 in FIG. 4, the attachment 600 is attached to the tool mounting surface 122 provided in a link connected on the tip side of the robot 100 relative to the sixth axis a6. P2 in FIG. 4 indicates the barycenter position of the attachment 600. Further, at a position P3 in FIG. 5, the attachment 600 is attached to the second arm 108 of the robot 100, and P4 indicates the barycenter position of the attachment 600. Assuming an attachment position to be a position related to an axis closest to the pedestal 102 side, the attachment position P1 is a position related to the sixth axis a6 in the case of FIG. 4, and the attachment position P3 is a position related to the third axis a3 in the case of FIG. 5. Further, a barycenter position is coordinates viewed from an attachment position, and for example, a value predetermined according to the specification, the shape, and/or the like of the attachment 600 or a value calculated based on the density, the shape, and/or the like of the attachment 600 may be used.

In the case of FIG. 4, a user inputs the attachment position P1 and the barycenter position P2 from the teaching operation panel 500 as information about the attachment 600. Further, in the case of FIG. 5, a user inputs the barycenter position P3 and the barycenter position P4 of the attachment 600 from the teaching operation panel 500. The input attachment position and the input barycenter position are acquired by the acquisition unit 341.

The calculation unit 342 in the processor 340 calculates at least one of the velocity, the acceleration, and the acting force of the attachment generated when the robot 100 executes operation. Assuming that the attachment 600 is attached between an i-th axis and an (i+1)-th axis, a relation between the angular velocity of each of the first axis to the i-th axis, and the barycenter velocity and the attitude angular velocity of the attachment is represented by a Jacobian matrix J. The Jacobian matrix J is found by partially differentiating a relation in terms of forward kinematics between "the angle of each of the first axis to the i-th axis (the angle of each axis on the pedestal 102 side relative to the attachment), a positional relation between the axes (parameters determined from the specification of the robot 100, such as the lengths of the first arm 106 and the second arm 108), and the barycenter position of the attachment viewed from the i-th axis center" and "the barycenter position of the attachment viewed from the origin of the robot coordinate system $\Sigma b$," based on information input by a user. Note that values previously stored in the ROM in the memory 303 is used as the parameters determined from the specification of the robot 100, such as the lengths of the first arm 106 and the second arm 108. Further, the barycenter position of the attachment viewed from the i-th axis center is acquired from the attachment position of the attachment on the robot 100 and the barycenter position of the attachment that are acquired by the acquisition unit 341.

Specifically, when the barycenter position and the attitude of the attachment that are viewed from the origin of the robot coordinate system $1b$ are denoted by r, the angles from the first axis to the i-th axis are denoted by $\theta$, and the Jacobian matrix is denoted by J, a micro displacement of the barycenter of the attachment and a micro rotation angle of the attitude of the attachment are functions of a micro rotation angle of each axis and are represented by the following known Equation (1). Further, by time-differentiating both sides of Equation (1), the following Equation (2) is acquired and thus a relation between "the angular acceleration of each of the first axis to the i-th axis" and "the barycenter acceleration and the attitude acceleration of the attachment" is acquired. Note that r is a vector including six components being a position and an attitude relative to three axes xyz of the robot coordinate system $\Sigma b$. For example, in the example in FIG. 5, r is a vector including six components being the position (x, y, z) and the attitude ($\varphi x$, $\varphi y$, $\varphi z$) of the barycenter position P4 relative to the robot coordinate system $\Sigma b$. Further, $\theta$ is a vector including angles ($\theta_1$, $\theta_2$, . . . , $\theta_i$) of the first axis to the i-th axis as components. The position and the attitude of the barycenter position P4 relative to the robot coordinate system $\Sigma b$ (vector r) can be defined in terms of forward kinematics from the angles ($\theta_1$, $\theta_2$, . . . , $\theta_i$) of the first axis to the i-th axis, and a positional relation between the axes and the barycenter position P4 of the attachment viewed from the i-th axis center, and therefore, the Jacobian matrix is acquired by partially differentiating the above. Note that i=3 in the example in FIG. 5.

[Math. 1]

$$\dot{r} = J\dot{\theta} \tag{1}$$

$$\ddot{r} = \dot{J}\dot{\theta} + J\ddot{\theta} \tag{2}$$

As described above, use of the Jacobian matrix J enables calculation of the velocity, the acceleration, the attitude angular velocity, and the attitude angular acceleration of the barycenter position of the attachment from the angular velocity and the angular acceleration of each of the first axis to the i-th axis. The calculation unit 342 calculates the velocity, the acceleration, the attitude angular velocity, and the attitude angular acceleration of the barycenter position of the attachment from the angular velocity and the angular acceleration of each of the first axis to the i-th axis by using the relationships represented by Equation (1) and Equation (2).

At this time, the calculation unit 342 can acquire information about the angular velocity of each of the first axis to the i-th axis from the operation program defining the operation of the robot 100 and can further acquire information about the angular acceleration of each of the first axis to the i-th axis. For example, the calculation unit 342 calculates the angular velocity and the angular acceleration of each of the first axis to the i-th axis from angular velocity information and angular acceleration information of the tip of the robot 100 described in the operation program and, based on the calculation result, can calculate the velocity, the acceleration, the attitude angular velocity, and the attitude angular acceleration of the barycenter position of the attachment. Alternatively, when angular velocity information and angular acceleration information of each of the first axis to the i-th axis are described in the operation program, the calculation unit 342 may calculate the velocity, the acceleration, the attitude angular velocity, and the attitude angular acceleration of the barycenter position of the attachment, based on the information.

Further, the calculation unit 342 calculates an acting force generated in the attachment by multiplying the calculated acceleration of the attachment by the mass of the attachment.

Note that while the description above assumes that the attachment 600 is attached between an i-th axis and an (i+1)-th axis, the calculation unit 342 similarly calculates the barycenter velocity, the acceleration, the attitude angular velocity, and the attitude angular acceleration of the attachment 600 at the barycenter position of the attachment 600 when the attachment 600 is attached on the tip side of the robot 100 relative to the sixth axis a6. For example, in the example in FIG. 4, the position and the attitude of the barycenter position P2 (vector r) relative to the robot coordinate system $\Sigma b$ can be defined in terms of forward kinematics from the angles $(\theta_1, \theta_2, \ldots, \theta_{i+1})$ of the first axis to the (i+1)-th axis, and a positional relation between the axes and the barycenter position P2 of the attachment viewed from the (i+1)-th axis center, and therefore the Jacobian matrix is acquired by partially differentiating the defined position and the defined attitude.

Further, when the robot 100 is a delta robot (parallel robot), the calculation unit 342 can calculate the velocity, the acceleration, the attitude angular velocity, and the attitude angular acceleration of the barycenter position of an attachment from parameters (an angular velocity and an angular acceleration) representing motion of an actuator included in the delta robot, the attachment position of the attachment relative to a link connected to a joint of the delta robot, and the barycenter position of the attachment, similarly to the articulated robot. Note that, in this case, a link connected to a joint includes a traveling plate of the delta robot. As a relation of the delta robot with forward kinematics, a known relation may be appropriately used. For example, in a case of a six-axis parallel robot, a Jacobian matrix and forward kinematics described in the literature "Development of a 6-DOF High-Speed Parallel Robot HEXA," by Masaru Uchiyama, et al., Journal of the Robotics Society of Japan, Vol. 12, No. 3, pp. 451 to 458, 1994 may be applied.

The comparison unit 343 in the processor 340 compares a velocity, an acceleration, or an acting force of the attachment calculated by the calculation unit 342 with a velocity, an acceleration, or an acting force in a limiting condition acquired by the acquisition unit 341, respectively. In addition to comparison for determining whether the velocity, the acceleration, or the acting force of the attachment calculated by the calculation unit 342 is greater than the velocity, the acceleration, or the acting force in the limiting condition acquired by the acquisition unit 341, the comparison unit 343 compares the value calculated by the calculation unit 342 with the value of the limiting condition such as determining a percentage of the velocity, the acceleration, or the acting force of the attachment calculated by the calculation unit 342 with respect to the velocity, the acceleration, or the acting force in the limiting condition acquired by the acquisition unit 341. When the operation program is modified as will be described later, the comparison unit 343 compares the velocity, the acceleration, or the acting force of the attachment calculated by the calculation unit 342 in accordance with the program after modification with the velocity, the acceleration, or the acting force in the limiting condition acquired by the acquisition unit 341, respectively.

Based on the comparison result by the comparison unit 343, the determination unit 344 in the processor 340 determines whether the velocity, the acceleration, or the acting force of the attachment calculated by the calculation unit 342 satisfies the velocity, the acceleration, or the acting force in the limiting condition acquired by the acquisition unit 341. The determination unit 344 determines that the limiting condition is not satisfied when the velocity, the acceleration, or the acting force of the attachment calculated by the calculation unit 342 is greater than the velocity, the acceleration, or the acting force in the limiting condition acquired by the acquisition unit 341. Further, the determination unit 344 may determine that the limiting condition is not satisfied when the ratio of the velocity, the acceleration, or the acting force of the attachment calculated by the calculation unit 342 to the velocity, the acceleration, or the acting force in the limiting condition acquired by the acquisition unit 341 exceeds a predetermined ratio (such as 80%).

Further, when determining that the velocity, the acceleration, or the acting force of the attachment calculated by the calculation unit 342 does not satisfy the limiting condition, the determination unit 344 further determines a place in the operation program where the limiting condition is not satisfied. For example, based on the velocity or the acceleration of the attachment generated from a motion of each axis (an angular velocity and an angular acceleration) when the tip of the robot 100 is operated at a velocity or an acceleration described in the operation program, the determination unit 344 determines, as a place where the limiting condition is not satisfied, a specific place (specific row) in the operation program where the operation requests motion generating a velocity, an acceleration, or an acting force exceeding the limiting condition to the attachment.

When the velocity, the acceleration, or the acting force of the attachment calculated by the calculation unit 342 does not satisfy the velocity, the acceleration, or the acting force in the limiting condition acquired by the acquisition unit 341, the program modification unit 345 in the processor 340 performs processing for modifying the operation program of the robot 100.

Two possible methods for modifying the operation program are a method of manual modification by a user and a method of automatic modification by the processor 340. Therefore, the processing for modifying the operation program performed by the program modification unit 345 includes processing of generating a modification instruction for instructing a user to modify the operation program and processing of automatically modifying the operation program. When a user manually modifies the operation program, the modification instruction generation unit 345a in the program modification unit 345 generates a modification instruction for causing the user to modify the operation program in such a way that the velocity, the acceleration, or the acting force of the attachment satisfies the limiting condition. The automatic modification unit 345b in the program modification unit 345 automatically modifies the operation program in such a way that the velocity, the acceleration, or the acting force of the attachment satisfies the limiting condition without manual modification by the user. Note that the user can specify whether to modify the operation program manually or automatically by an operation input to the teaching operation panel 500.

Further, when the velocity, the acceleration, or the acting force of the attachment calculated by the calculation unit 342 is less than the limiting condition and has a margin against the limiting condition according to the comparison result by the comparison unit 343, the automatic modification unit 345b may modify the operation program in such a way as to increase the velocity, the acceleration, or the acting force of the attachment within the limiting condition. Thus, the operation of the robot 100 is further speeded up within the limiting condition. Note that a user can specify further speed-up of the operation of the robot 100 within the limiting condition by an operation input to the teaching operation panel 500.

Similarly, when the velocity, the acceleration, or the acting force of the attachment calculated by the calculation unit 342 is less than the limiting condition and has a margin against the limiting condition according to the comparison result by the comparison unit 343, the modification instruction generation unit 345a may generate a modification instruction for causing modification of the operation program in such a way as to increase the velocity, the acceleration, or the acting force of the attachment within the limiting condition.

An example of automatic modification of the operation program based on a velocity and an acceleration will be described in detail below. In the following example, the operation program is modified by evaluating a velocity or an acceleration by an absolute value. The basic concept is that when the velocity of the barycenter of the attachment (the first-order differential of the vector r) indicated in the left side of the aforementioned Equation (1) is increased or decreased by x %, based on Equation (1), the angular velocity of each axis (the first-order differential of the angle θ) in the right side of Equation (1) is increased or decreased by x %. Accordingly, the velocity of the tip of the robot 100 described in the operation program is modified in such away as to be increased or decreased by x %.

Further, when the acceleration of the barycenter of the attachment (the second-order differential value of the vector r) indicated in the left side of the aforementioned Equation (2) is increased or decreased by x %, based on Equation (2), both the angular velocity of each axis (the first-order differential of the angle θ) and the angular acceleration of each axis (the second-order differential value of the angle θ) in the right side of Equation (2) are increased or decreased by x %.

Accordingly, the acceleration of the tip of the robot 100 described in the operation program is modified in such a way as to be increased or decreased by x %. However, the velocity of the barycenter of the attachment may not satisfy the limiting condition in this case, and therefore the velocity limiting condition needs to be considered when the acceleration is increased.

First, a case of modifying the operation program, based on the velocity limiting condition, will be described. A threshold value of the velocity limiting condition of the attachment acquired by the acquisition unit 341 is denoted by $v_{lim}$, and the velocity of the attachment calculated by the calculation unit 342 is denoted by $v_{act}$. The determination unit 344 determines that the limiting condition is satisfied when $v_{act}-v_{lim} \leq 0$ and that the limiting condition is not satisfied when $v_{act}-v_{lim} > 0$. When the limiting condition is not satisfied, the automatic modification unit 345b decreases the angular velocity of each axis by $[(v_{act}-v_{lim})/v_{act}]*100$ [%].

Further, when the velocity limiting condition is satisfied, the automatic modification unit 345b may speed up the operation of the robot 100 by increasing the velocity. In this case, the automatic modification unit 345b increases the angular velocity of each axis by $|(v_{lim}-v_{act})/v_{act}|*100[\%]$.

Next, a case of modifying the operation program, based on the acceleration limiting condition, will be described. A threshold value of the acceleration limiting condition of the attachment acquired by the acquisition unit 341 is denoted by $a_{lim}$, and the acceleration of the attachment calculated by the calculation unit 342 is denoted by $a_{act}$. The determination unit 344 determines that the limiting condition is satisfied when $a_{act}-a_{lim} \leq 0$ and that the limiting condition is not satisfied when $a_{act}-a_{lim} > 0$. When the limiting condition is not satisfied, the automatic modification unit 345b decreases the angular velocity of each axis and the angular acceleration of each axis by $[(a_{act}-a_{lim})/a_{act}]*100$ [%].

Further, when the acceleration limiting condition is satisfied, the automatic modification unit 345b may speed up the operation of the robot 100 by increasing the velocity and the acceleration. In this case, since the acceleration has a smaller margin against the limiting condition than the velocity when $(v_{lim}-v_{act})/v_{act} \geq (a_{lim}-a_{act})/a_{act}$, the automatic modification unit 345b increases the angular velocity of each axis and the angular acceleration of each axis by $[(a_{lim}-a_{act})/a_{act}]*100[\%]$, based on the acceleration.

Further, since the velocity has a smaller margin against the limiting condition than the acceleration when $|(v_{lim}-v_{act})/v_{act}| < (a_{lim}-a_{act})/a_{act}$, the automatic modification unit 345b increases the angular velocity of each axis and the angular acceleration of each axis by $|(v_{lim}-v_{act})/v_{act}|*100$ [%], based on the velocity. Note that when the velocity limiting condition does not exist, the automatic modification unit 345b increases the angular velocity of each axis and the angular acceleration of each axis by $[(a_{lim}-a_{act})/a_{act}]*100$ [%]. Further, the velocity of the attachment may not satisfy the limiting condition as described above, and therefore, the velocity limiting condition is considered when the acceleration is increased.

Note that when the user manually modifies the operation program, the modification instruction generation unit 351a generates a modification instruction including a ratio (%) by which the aforementioned velocity or the aforementioned acceleration is to be decreased or increased.

The display processing unit 346 in the processor 340 performs processing for causing the display device 400 to display a content related to modification of the operation program. For example, the display processing unit 346 performs processing for displaying the operation program of the robot 100 stored in the memory 330 on the display device 400. Further, the display processing unit 346 performs processing for displaying a place (row) in the operation program determined not to satisfy the limiting condition by the determination unit 344 on the display device 400. Furthermore, the display processing unit 346 performs processing for displaying a modification instruction generated by the modification instruction generation unit 345*a* on the display device 400. For the displays described above, the display processing unit 346 performs processing for causing pixels of a related part to emit light, and the like on a display screen of the display device 400.

Figure 6:
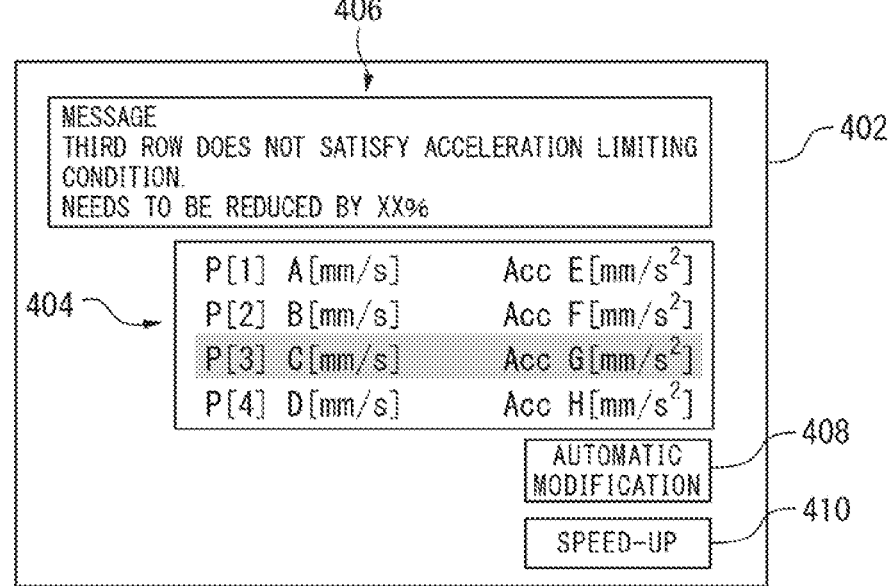
FIG. 6 is a schematic diagram illustrating a display content being related to modification of an operation program and being displayed on a display screen of a display device.

FIG. 6 is a schematic diagram illustrating a display content being displayed on a display screen 402 of the display device 400 and being related to modification of the operation program. As illustrated in FIG. 6, an operation program 404 is displayed on the display screen 402. The position of the tip of the robot 100 (the position of an axis positioned closest to the tip) P[1], the velocity A [mm/s], and the acceleration (Acc) E [mm/s²] are indicated in the first row of the operation program 404. Similarly, the position of the tip of the robot 100, the velocity, and the acceleration are also indicated in the second to fourth rows of the operation program 404. The operation of the robot 100 transitions sequentially from the first row. For example, when the tip of the robot 100 is positioned at P[2] in accordance with the operation program 404, the tip of the robot 100 moves at a velocity B and an acceleration F. Note that while the velocity and the acceleration of the displacement of the robot 100 in the operation program 404 are indicated in FIG. 6, the angular velocity and the angular acceleration of the attitude may be similarly displayed. Further, the velocity and the acceleration of each axis may be indicated in the operation program 404.

When a limiting condition specified by the user is not satisfied in a case of operation being performed in accordance with a condition described in each row of the operation program 404 of the robot 10, a row in which a destination point after movement is described is highlighted. FIG. 6 illustrates a case of the acceleration calculated by the calculation unit 342 not satisfying a limiting condition when the tip of the robot 100 moves from the position P[2] to a position P[3], and the third row of the operation program 404 is highlighted in this case. Note that as described above, a row of the operation program 404 in which a limiting condition is not satisfied is determined by the determination unit 344. Then, processing for highlighting is performed by the display processing unit 346. Note that highlighting is performed in a color different from the color of the background or a character on the display screen 402. Thus, the user can visually recognize a row of the operation program 404 in which a limiting condition is not satisfied on the display screen 402.

Further, a message 406 of modification instruction "THIRD ROW DOES NOT SATISFY ACCELERATION LIMITING CONDITION. ACCELERATION NEEDS TO BE REDUCED BY XX %" is displayed above the display position of the operation program 404. The message 406 of modification instruction is generated by the modification instruction generation unit 345*a*. Thus, a condition not being satisfied in the operation program 404 and how the operation program 404 may be modified can be presented to the user, which can prompt the user to modify the operation program 404. While the case of the acceleration in the operation program not satisfying a limiting condition is described in FIG. 6, a similar message 406 is displayed when the velocity in the operation program 404 does not satisfy a limiting condition.

Further, an automatic modification button 408 for selecting automatic modification by a user and a speed-up button 410 for selecting speed-up of the robot 100 by the user when a limiting condition is satisfied are displayed under the operation program 404. The user can select automatic modification by moving a cursor on the display screen 402 over the automatic modification button 408 by operating the teaching operation panel 500, and pressing (clicking) the automatic modification button 408. When automatic modification is selected, automatic modification of the operation program 404 by the automatic modification unit 345*b* is performed, and the highlighted row (third row) of the operation program 404 is automatically rewritten in such a way as to satisfy the limiting condition.

Similarly, when a limiting condition is satisfied, the user can select speed-up of the operation of the robot 100 while satisfying the limiting condition by moving the cursor on the display screen 402 over the speed-up button 410 by operating the teaching operation panel 500, and pressing the speed-up button 410.

Note that while a message 406 in the case of a limiting condition not being satisfied is illustrated in FIG. 6, a message 406 prompting speed-up may be displayed when the limiting condition is satisfied. In this case, for example, a message 406 such as "ACCELERATION LIMITING CONDITION IS SATISFIED, AND ACCELERATION CAN BE INCREASED BY XX %" is displayed. The user can speed up the operation of the robot 100 by clicking the speed-up button 410 or modifying the operation program 404 in accordance with the message 406 prompting speed-up.

The robot control unit 347 in the processor 340 controls the operation of the robot 100 by controlling the servo motor in each joint in accordance with the operation program. When the operation program is modified, the robot control unit 347 controls the operation of the robot 100 in accordance with the operation program after modification.

Figure 7:
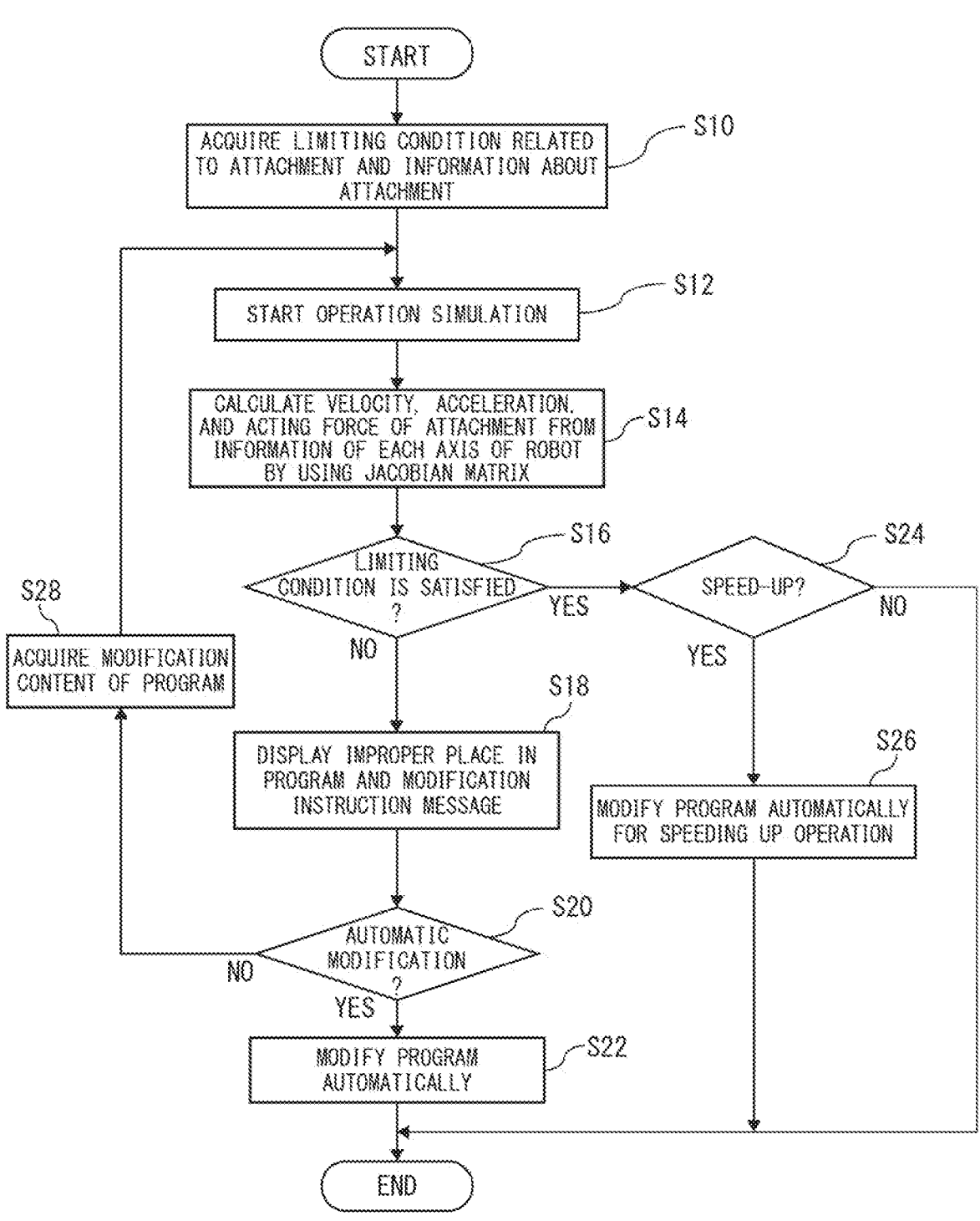
FIG. 7 is a flowchart for illustrating processing in a robot operation simulation method according to the present embodiment.

Next, processing in a robot operation simulation method according to the present embodiment will be described based on a flowchart in FIG. 7. The processing illustrated in FIG. 7 is performed on a predetermined control cycle by the processor 340 in the control device 300. As a premise of performing a robot operation simulation, a user generates an operation program and stores the program in the memory 330.

First, the acquisition unit 341 in the processor 340 acquires a limiting condition related to an attachment and information about the attachment (such as the mass, the attachment position, and the barycenter position of the attachment) (step S10). When acquiring the limiting condition related to the attachment and the information about the attachment, the processor 34) starts an operation simulation of the robot 100 (step S12).

Next, the calculation unit 342 in the processor 340 calculates the velocity, the acceleration, and the acting force of the attachment from information (the velocity and the acceleration) of each axis of the robot 100 by using a Jacobian matrix (step S14). Next, the comparison unit 343 compares the limiting condition with the velocity, the acceleration, or the acting force of the attachment calculated in step S14, and the determination unit 344 determines whether the limiting condition is satisfied (step S16).

When the limiting condition is determined not to be satisfied in step S16, the modification instruction generation unit 345*a* generates a modification instruction for causing the user to modify the operation program, and the display processing unit 346 displays the modification instruction along with an improper place in the operation program on the display screen of the display device 400 (step S18).

Next, whether the automatic modification button 408 is pressed is determined (step S20), and when the automatic modification button 408 is pressed, the automatic modification unit 345*b* automatically modifies the operation program (step S22). The processing in this control cycle ends after step S22.

Further, when the automatic modification button 408 is not pressed in step S20, the user manually modifies the operation program, and therefore, a modification content of the operation program input by the user from the teaching operation panel 500 is acquired (step S28), and the processing returns to the operation simulation processing in and after step S12.

Further, when the limiting condition is determined to be satisfied in step S16, whether the speed-up button 410 is pressed is determined (step S24), and when the speed-up button 410 is pressed, the automatic modification unit 345*b* automatically modifies the operation program in such a way as to speed up the operation of the robot 100 (step S26). The processing in this control cycle ends after step S26. Further, when the speed-up button 410 is not pressed in step S24, the processing in this control cycle ends. Note that in step S26, the user may manually modify the operation program in accordance with the modification instruction generated by the modification instruction generation unit 345*a* instead of the automatic modification unit 345*b* automatically modifying the operation program.

Note that the robot system 1000 may include a plurality of robots 100 and a plurality of control devices 300 respectively related to the plurality of robots 100. Each of the plurality of control devices 300 calculates at least one of a velocity, an acceleration, and an acting force generated in an attachment on a related robot 100 and compares the calculated result with a limiting condition. The plurality of control devices 300 may be interconnected through a network and may be further connected, through the network, to an upper-side device receiving comparison results by the plurality of control devices 300. The upper-side device may perform failure prediction, based on the received comparison results in the individual control devices 300. Even when the velocity, the acceleration, or the acting force of an attachment in an individual robot 100 satisfies a limiting condition, the upper-side device can recognize the possibility of failure occurrence in the attachment of the robot 100 by acquiring information such as an amount of margin of the velocity, the acceleration, or the acting force of the attachment in the robot 100 against the limiting condition and thus can perform failure prediction of the robot 100.

According to the present embodiment, whether the velocity, the acceleration, or the acting force of an attachment satisfies a limiting condition is determined by a simulation without actually operating the robot 100, and when the limiting condition is not satisfied, the operation program is modified, as described above. Accordingly, unexpected damage of the attachment when the robot 100 is actually operated is suppressed by the operation program being previously modified in such a way as to satisfy the limiting condition. Further, since a user sets a limiting condition of an attachment, and information about the attachment, such as the mass, the attachment position, and the barycenter position of the attachment, an operation program can be generated and modified in such a way as to fit various attachments attached to the robot 100, and therefore, an attachment does not need to be selected according to a constraint on the operation of the robot 100 when being selected. Thus, an operation program satisfying limiting conditions on various attachments can be readily generated.

Every example and specific terminology recited herein is intended for instructive purposes to aid the reader in understanding the present invention and the concept contributed by the inventor to furthering the art and are to be construed as not being limitation to the configuration of any example herein and such specifically recited examples and conditions, in relation to indication of superiority and inferiority of the present invention. While the embodiments of the present invention have been described in detail, it should be understood that various changes, substitutions, and modifications can be made without departing from the spirit and scope of the present invention.

REFERENCE SIGNS LIST

1 Floor
100 Robot
102 Pedestal
104 Rotary stage
106 First arm
108 Second arm
110 Wrist
112, 114, 116, 118, 119, 120 Joint
122 Tool mounting surface
130 Servo motor
200 Tool
300 Control device
302 Communication line
310 Communication interface
320 Drive circuit
330 Memory
340 Processor
341 Acquisition unit
342 Calculation unit
343 Comparison unit
344 Determination unit
345 Program modification unit
345*a* Modification instruction generation unit
345*b* Automatic modification unit
346 Display processing unit
347 Robot control unit
400 Display device
402 Display screen
404 Operation program
406 Message
408 Automatic modification button
410 Speed-up button
500 Teaching operation panel
600 Attachment
1000 Robot system

The invention claimed is:

1. A robot operation simulation device comprising:

a processor configured to:

acquire a position of an attachment attached to a link connected to a joint of a robot relative to the robot, the joint including a rotatable or linearly movable axis, and a limiting condition on at least one of a velocity, an acceleration, and an acting force generated in the attachment when the robot operates;

calculate at least one of a velocity, an acceleration, and an acting force expected to be generated in the attachment according to the acquired position of the attachment relative to the robot when the robot executes operation, wherein the value of at least one of the velocity, the acceleration, and the acting force is different depends on the acquired position of the attachment relative to the robot;

compare at least one of the velocity, the acceleration, and the acting force calculated with the limiting condition;

determine whether at least one of the velocity, the acceleration, and the acting force calculated satisfies the limiting condition, based on a comparison result; and modify the operation program in such a way that at least one of the velocity, the acceleration, and the acting force calculated satisfies the limiting condition, when at least one of the velocity, the acceleration, and the acting force calculated does not satisfy the limiting condition.

2. The robot operation simulation device according to claim 1, wherein the processor is further configured to determine a place where the limiting condition is not satisfied in an operation program describing operation of the robot, when determining that at least one of the velocity, the acceleration, and the acting force calculated does not satisfy the limiting condition, and to perform processing for displaying, on a display device, a place where the limiting condition is not satisfied in the operation program.

3. The robot operation simulation device according to claim 2, wherein the processor is further configured to generate a modification instruction for causing the operation program to be modified in such a way that at least one of the velocity, the acceleration, and the acting force calculated satisfies the limiting condition, when at least one of the velocity, the acceleration, and the acting force calculated does not satisfy the limiting condition, and to perform processing for displaying the modification instruction on the display device.

4. The robot operation simulation device according to claim 3, wherein the processor is configured to generate a modification instruction for causing the operation program to be modified in such a way as to increase the velocity, the acceleration related to the limiting condition within the limiting condition, when the velocity or the acceleration calculated satisfies the limiting condition.

5. The robot operation simulation device according to claim 3, wherein the processor is configured to calculate at least one of the velocity, the acceleration, and the acting force expected to be generated in the attachment when the robot executes operation in accordance with the operation program after modification modified in accordance with the modification instruction, and to compare at least one of the velocity, the acceleration, and the acting force calculated in accordance with the operation program after modification with the limiting condition.

6. The robot operation simulation device according to claim 2, wherein the processor is configured to modify the operation program in such a way as to increase the velocity or the acceleration related to the limiting condition within the limiting condition, when the velocity or the acceleration calculated satisfies the limiting condition.

7. The robot operation simulation device according to claim 1, wherein the robot is an articulated robot including a plurality of the joints each of which includes the axis, and the attachment is attached to the link connected to each of the adjoining joints or the link closest to a tip of the robot.

8. A robot control device comprising:

the robot operation simulation device according to claim 1; and a processor configured to control operation of the robot.

9. A robot operation simulation method comprising:

a step of acquiring a position of an attachment attached to a link connected to a joint of a robot relative to the robot, the joint including a rotatable or linearly movable axis, and a limiting condition on at least one of a velocity, an acceleration, and an acting force generated in the attachment when the robot operates;

a step of calculating at least one of a velocity, an acceleration, and an acting force expected to be generated in the attachment according to the acquired position of the attachment relative to the robot when the robot executes operation, wherein the value of at least one of the velocity, the acceleration, and the acting force is different depends on the acquired position of the attachment relative to the robot;

a step of comparing at least one of the calculated velocity, the calculated acceleration, and the calculated acting force with the limiting condition;

a step of determining whether at least one of the velocity, the acceleration, and the acting force calculated satisfies the limiting condition, based on a comparison result; and a step of modifying the operation program in such a way that at least one of the velocity, the acceleration, and the acting force calculated satisfies the limiting condition, when at least one of the velocity, the acceleration, and the acting force calculated does not satisfy the limiting condition.

* * * * *